US008352624B2

(12) United States Patent
Zimmerman et al.

(10) Patent No.: US 8,352,624 B2
(45) Date of Patent: Jan. 8, 2013

(54) SYSTEM FOR AND METHOD OF STREAMING DATA TO A COMPUTER IN A NETWORK (75) Inventors: Myron Zimmerman, Needham, MA (US); Robert Lusinsky, Anaheim Hills, CA (US); Gint Burokas, Orland Park, IL (US); Mike Garelick, Oceanside, CA (US); Marc Sandusky, Aliso Viejo, CA (US); Kenny Bunch, Chesapeake, VA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 749 days.

(21) Appl. No.: 11/957,929

(22) Filed: Dec. 17, 2007

(65) Prior Publication Data
US 2008/0098100 A1    Apr. 24, 2008

Related U.S. Application Data (63) Continuation of application No. 10/124,877, filed on Apr. 18, 2002, now Pat. No. 7,321,936.

(51) Int. Cl.
*G06F 15/16* (2006.01)
(52) U.S. Cl. ............. 709/231; 709/226; 709/217; 713/2
(58) Field of Classification Search .................... 709/231
See application file for complete search history.

(56) References Cited

U.S. PATENT DOCUMENTS

| | | | |
|---|---|---|---|
| 5,230,052 A * | 7/1993 | Dayan et al. ........................ 713/2 |
| 5,280,627 A | 1/1994 | Flaherty et al. | |
| 5,404,527 A | 4/1995 | Irwin et al. | |
| 5,452,454 A * | 9/1995 | Basu ................................ 713/2 |
| 5,519,869 A | 5/1996 | Payne et al. | |
| 5,577,210 A | 11/1996 | Abdous et al. | |
| 5,594,863 A | 1/1997 | Stiles | |
| 5,694,600 A * | 12/1997 | Khenson et al. ................... 713/2 |
| 5,708,820 A * | 1/1998 | Park et al. ...................... 713/323 |
| 5,822,582 A | 10/1998 | Doragh et al. | |
| 5,974,547 A * | 10/1999 | Klimenko ......................... 713/2 |
| 5,991,542 A | 11/1999 | Han et al. | |
| 6,080,207 A | 6/2000 | Kroening et al. | |
| 6,098,158 A | 8/2000 | Lay et al. | |
| 6,101,601 A * | 8/2000 | Matthews et al. ................. 713/2 |

(Continued)

FOREIGN PATENT DOCUMENTS
EP        0658843        6/1995
(Continued)

OTHER PUBLICATIONS

International Preliminary Examination Report (IPER), from PCT Application No. PCT/US02/12272, filed Apr. 18, 2002.

(Continued)

*Primary Examiner* — Firmin Backer
*Assistant Examiner* — Hamza Algibhah
(74) *Attorney, Agent, or Firm* — Foley and Lardner LLP; John D. Lanza (57) ABSTRACT A system for and method of rapidly streaming data to one or more client devices, such as personal computers (PC's) from a server employing virtual disk emulation and broadcasting or multicasting of data residing on a network server. In some embodiments, the streamed data includes files necessary to boot and configure the one or more client devices, the data including hibernation, O/S and application files.

13 Claims, 5 Drawing Sheets

U.S. PATENT DOCUMENTS

| | | | |
|---|---|---|---|
| 6,108,697 A | 8/2000 | Raymond et al. | |
| 6,189,100 B1* | 2/2001 | Barr et al. | 713/182 |
| 6,209,088 B1 | 3/2001 | Reneris | |
| 6,226,667 B1 | 5/2001 | Matthews et al. | |
| 6,256,673 B1 | 7/2001 | Gayman | |
| 6,282,711 B1 | 8/2001 | Halpern et al. | |
| 6,334,149 B1 | 12/2001 | Davis, Jr. et al. | |
| 6,401,093 B1* | 6/2002 | Anand et al. | 1/1 |
| 6,415,382 B1* | 7/2002 | Kwan | 713/2 |
| 6,453,334 B1 | 9/2002 | Vison et al. | |
| 6,463,530 B1* | 10/2002 | Sposato | 713/2 |
| 6,487,718 B1 | 11/2002 | Rodriguez et al. | |
| 6,502,207 B1 | 12/2002 | Itoh et al. | |
| 6,567,774 B1 | 5/2003 | Lee et al. | |
| 6,601,096 B1 | 7/2003 | Lassiter, Jr. | |
| 6,601,166 B1* | 7/2003 | Ayyar et al. | 713/2 |
| 6,643,772 B1* | 11/2003 | Aguilar et al. | 713/2 |
| 6,735,692 B1* | 5/2004 | Murphrey et al. | 713/1 |
| 6,760,850 B1 | 7/2004 | Atkinson et al. | |
| 6,810,478 B1 | 10/2004 | Anand et al. | |
| 6,816,963 B1 | 11/2004 | Krithivas et al. | |
| 6,883,093 B2 | 4/2005 | McBrearty et al. | |
| 6,898,701 B2 | 5/2005 | French et al. | |
| 6,928,538 B2 | 8/2005 | French et al. | |
| 6,928,541 B2 | 8/2005 | Sekiguchi | |
| 6,931,553 B1 | 8/2005 | Plante et al. | |
| 6,941,518 B2 | 9/2005 | French et al. | |
| 6,954,852 B2 | 10/2005 | Burokas et al. | |
| 6,976,039 B2 | 12/2005 | Chefalas et al. | |
| 6,988,193 B2 | 1/2006 | French et al. | |
| 6,996,706 B1* | 2/2006 | Madden et al. | 713/2 |
| 7,024,484 B2 | 4/2006 | Alexis | |
| 7,024,549 B1* | 4/2006 | Luu et al. | 713/2 |
| 7,036,040 B2 | 4/2006 | Nicholson et al. | |
| 7,054,198 B2 | 5/2006 | Chevallier et al. | |
| 7,062,645 B2 | 6/2006 | Kroening | |
| 7,178,167 B1 | 2/2007 | Katoh et al. | |
| 7,191,261 B2* | 3/2007 | Morgan | 710/62 |
| 7,194,619 B2* | 3/2007 | Abbondanzio et al. | 713/155 |
| 7,321,936 B2* | 1/2008 | Zimmerman et al. | 709/231 |
| 7,334,122 B2 | 2/2008 | Burokas et al. | |
| 7,363,374 B2* | 4/2008 | Paul et al. | 709/226 |
| 7,865,579 B2 | 1/2011 | Birse et al. | |
| 8,090,808 B2* | 1/2012 | Burokas et al. | 709/222 |
| 2002/0078188 A1* | 6/2002 | Anand et al. | 709/222 |
| 2002/0099971 A1* | 7/2002 | Merkin et al. | 714/6 |
| 2002/0161868 A1* | 10/2002 | Paul et al. | 709/221 |
| 2003/0005096 A1* | 1/2003 | Paul et al. | 709/222 |
| 2003/0088650 A1* | 5/2003 | Fassold et al. | 709/220 |
| 2003/0126242 A1* | 7/2003 | Chang | 709/222 |
| 2003/0126426 A1* | 7/2003 | Frye, Jr. | 713/2 |
| 2003/0188176 A1* | 10/2003 | Abbondanzio et al. | 713/191 |
| 2003/0200290 A1 | 10/2003 | Zimmerman et al. | |
| 2003/0208675 A1 | 11/2003 | Burokas et al. | |
| 2004/0236974 A1 | 11/2004 | Brown et al. | |
| 2007/0094321 A1 | 4/2007 | Nussey et al. | |
| 2008/0140816 A1* | 6/2008 | Burokas et al. | 709/222 |

FOREIGN PATENT DOCUMENTS

| | | |
|---|---|---|
| EP | 1501196 | 1/2005 |
| JP | 2000-250875 | 9/2000 |
| JP | 2000250875 | 9/2000 |
| WO | WO-0197016 | 12/2001 |
| WO | WO-03090073 | 10/2003 |
| WO | WO-03090109 | 10/2003 |

OTHER PUBLICATIONS

File history pertaining to US Patent No. 7,321,936.
Communication from the Examining Division dated Apr. 16, 2008 for European Patent Application No. 02746314.0.
Communication from the Examining Division dated Sep. 4, 2008 for European Patent Application No. 02807266.8.
"Cut Power Use and Extend Battey Life with Standby and Hibernate", http://www.microsoft.com/windows2000/techenthusiast/features/stanby1127.asp, Jan. 2, 2001, pp. 1-7.
Emberson Lanworks Technologies Inc. A: "TFTP Multicast Option"; IETF Standard, Internet Engineering Task Force, IETF, CH, Feb. 1997, XP015007874, ISSN: 0000-0003.
Examiner's first report on Australian Patent Application No. 2002316042 dated Feb. 20, 2008.
First Examination Report dated Jan. 10, 2007 issued by the Indian Patent Office for Indian Patent Application No. 1577/KOLNP/2004.
First Office Action from the Chinese State Intellectual Property Office for Chinese Patent Application No. 02828969.2.
Intel: "Preboot Execution Environment (PXE) Specification, Version 2.1"; Internet Citation, [online] Sep. 20, 1999, XP002402606; Retrieved from the Internet: URL:http://www.pix.net/software/pxeboot/archive/pxespec.pdf> [retrieved on Oct. 11, 2006].
International Preliminary Examination Report (IPER), from related PCT Application No. PCT/US02/12272, filed Apr. 18, 2002.
International Search Report for International Patent Application PCT/US06/043446 dated Mar. 6, 2007.
Iwanski; Norton Ghost 6.0 Enterprise Edition; May 2000.
nternational Preliminary Examination Report (IPER), from related PCT Application No. PCT/US02/12275, filed Apr. 18, 2002.
Official Action dated Aug. 7, 2007 issued by the Japanese Patent Office for Japanese Patent Application No. 2003-586749.
Official Action dated Aug. 9, 2007 issued by the Japanese Patent Office for Japanese Patent Application No. 2003-586784.
Official Action dated Dec. 5, 2006 issued by the Japanese Patent Office for Japanese Patent Application No. 2003-586749.
Official Action dated Nov. 30, 2006 issued by the Japanese Patent Office for Japanese Paten Application No. 2003-586784.
Official Communication dated Jan. 2, 2008 issued by the Indian Patent Office for Indian Patent Application No. 1577/KOLNP/2004.
PCT International Search Report for PCT/US02/12275, filed Apr. 18, 2002.
Supplementary European Search Report for European Patent Application No. 02807266.8 dated Mar. 12, 2008.
Supplementary European Search Report for European Patent Application No. 02746314.0.
Symantec; How Ghost Multicasting communicates over the network; 2005.
Symantec; Norton Ghost 7.0 Product Manuals; Apr. 20, 2001.
Symantec; Norton Ghost Enterprise Getting Started Guide; 1999.
"Use Hibernate and Standby to Conserve Batteries", http://www.microsoft.com/windowsxp/using/mobility/getstarted/hibernate.mspx, Aug. 24, 2001, pp. 1-3.
Windows XP/2000 boot process explained, PC Plus, http://www.pcplus.com.uk/tips/default.asp?siteid=10&sectiontypeid=6&subsectionid=398 . . . , Mar. 2003, 1 page.
Written Opinion of International Searching Authority for International Patent Application No. PCT/US2006/043446 dated Jul. 17, 2008.
Written Opinion of International Searching Authority for International Patent Application No. PCT/US02/12775 dated Feb. 3, 2004.
"Flip the switch, It's On, Press the bottom, It's On, Competitive advantage, It's On", Ardence, http://www.ardence.com/embedded/products.aspx?ID=72, retrieved from Internet Jun. 28, 2005, pp. 1-2.
Japanese Official Action on 2008-028207 dated Jun. 7, 2011.
Japanese Official Action on 2008-031140 dated Jun. 14, 2011.
Notice of Allowance on U.S. Appl. No. 12/014,529 dated Jun. 24, 2011.
Office Action on U.S. Appl. No. 12/014,529 dated Sep. 29, 2010.
European Communication Pursuant to Article 94(3) EPC on 02746314.0 dated Oct. 13, 2011.
Japanese Official Action on 2008-28207 dated Dec. 13, 2011.
Japanese Official Action on 2008-31140 dated Mar. 29, 2012.

* cited by examiner

SYSTEM FOR AND METHOD OF STREAMING DATA TO A COMPUTER IN A NETWORK

FIELD OF THE INVENTION

The present invention relates generally to the simultaneous transfer of data from a network server to one or more client devices, such as personal computers (PC's), in a network. More specifically, the invention facilitates remote management of client devices by employing virtual disk emulation and broadcasting or multicasting of desired data. In some embodiments, said data includes operating system (O/S), hibernation, and application files which reside on the network server and are used to boot and/or configure the one or more client devices.

BACKGROUND OF THE INVENTION

Computer networks are commonly used in offices or corporate environments to interconnect personal computers (PCs). With the growth of PC usage has come an increasing demand to share computer files and facilitate administration of each PC after installation. In a network comprised of many PCs, the cost to an organization of having an Information Technology representative physically visit and service each PC can be enormous. In order to reduce these costs, software and computer manufacturers have developed technologies aimed at maintaining software products centrally on a network server and then downloading the desired software, via the network, to each client PC.

Network-centric computing has also imposed new requirements on the PC architecture. Embedded systems are typically small, inexpensive and are designed as dedicated fixed purpose devices. PC's are expandable general purpose computing platforms that can be used for many different roles at different points in their lifetime. Many forms of modern embedded systems are connected to communications mechanisms that allow them to interact with other intelligent connected equipment, by transmitting data packets across the network according to a set of rules called "transport protocols." In order for two computers in a network, such as a server and a client, to communicate with one another, each computer must use the proper transport protocol for the particular network. The present invention employs standard TFTP (trivial file transport protocol) and DHCP (Dynamic Host Configuration Protocol) for network communications.

Designers and manufacturers of embedded intelligent connected equipment are looking for ways to reduce cost and improve manageability & reliability, facilitate deployment and secure intellectual property within these devices. One way to accomplish this is to introduce the ability for the client PC to boot from the network. The purpose of a PC's boot process is to load the necessary operating system components, initialize the hardware devices and present to the user an application. This is a long process and one that under normal conditions needs to consider changes in hardware or software configurations, as well as changes in authorized users. Network booting is better suited to those situations wherein the PC's associated hardware is fixed and the client PC's role does not change frequently. Network booting allows for the removal of the client PC's hard disk and facilitates centralized management of software content. Because current network bandwidth (10/100 Mbs and 1 Gbs) does not approach the speed of a client PC's local hard disk, a remote "cold boot" of an operating system (O/S) in a client PC from a network server is not terribly efficient and can take a great deal of time. Furthermore, bandwidth and network server resources can be further degraded by the additional challenge of attempting to boot simultaneously scores of client devices (a "boot storm".) The lengthy time required to "cold boot" further distracts from the perception and behavior of a typical embedded device. Thus, what is needed is a scalable way to speed up the transfer of desired data from a central repository, such as a network server, to a plurality of client devices in a network.

U.S. Pat. No. 6,101,601 to Matthews, et al., discloses an approach to resolving the long boot time associated with remotely booting a client device from a boot image in a network. However, that patent teaches resuming, following a reset of some kind, from a hibernation image stored on each client PC's local storage media. This approach requires any reconfiguration of the desired state of the PC to be performed prior to the hibernation of the client PC, and could possibly run afoul of network bandwidth problems as the server individually transfers a plurality of hibernate images to a corresponding plurality of client PCs in networks with large numbers of client PCs.

U.S. Pat. No. 5,974,547 to Klimenko teaches an apparatus for and method of using disk emulation for booting a 32-bit PC operating system (O/S) on a client computer through a networked connection to a server. In particular, that patent teaches a method of switching (on each disk I/O call) between the 32-bit protected mode processing of Windows 9x O/S's and the 16-bit real mode used by the BIOS, often referred to as "thunking", until the client's O/S is able to perform networking on its own. The method and apparatus presented therein is particularly suited to booting an O/S such as Windows 95® from a server by downloading a complete image of the software applications desired on the client PC, including the O/S. However, that patent does not envision the use of broadcasting or multicasting of desired data, which in certain preferred embodiments might include a hibernation file, to a plurality of client PCs in the network.

SUMMARY OF THE INVENTION

The present invention provides a system for and method of streaming data from a network server to one or more client PCs. The data may be retrieved in a predetermined manner from a plurality of sectors of a storage device associated with the network server. During operation, the one or more client PC's issue a corresponding number of requests for a download of the plurality of sectors. The requests are forwarded to the server, which transparently emulates operation of a local disk at each of the client PCs. The server operates to broadcast or to simultaneously multicast to the requesting clients the desired data from a virtual hard drive associated with the server. The server preferably accepts download requests during a predetermined invitation period, prior to transmitting the desired data.

In certain embodiments, the emulation is affected by executing emulation code resident on each of the client PCs. Preferably; the emulation code is pre-execution boot environment (PXE) code resident on a network interface card (NIC) of each client PC. In alternative embodiments, the emulation is a result of inventive boot code downloaded from the network server which when executed assumes disk access control by an interrupt handling procedure (Int 13h) and requests the desired data. And in yet another embodiment, the emulation is effected at each client PC by executing portions of the O/S (preferably Windows 2000, NT or XP®) and two inventive drivers downloaded from the network server, which similarly assumes control of the client's network interface and generates requests for desired data.

The streamed data may be broadcast or multicast in simultaneous burst mode from the network server to client PC's requesting a download. Therefore, the data need only be transmitted once from the network server, rather than redundantly to each client PC. As data sectors are received at each client, they are queued into data caches pre-allocated by the inventive drivers. This advantageously allows each client to concern itself with other activities, such as initializing O/S data structures, drivers and/or applications.

In certain embodiments, the present invention provides a system for and method of booting an O/S on one or more client PCs from a network server employing virtual disk emulation and the streaming method to multicast or broadcast prearranged portions of the disk image from the server to one or more clients. The inventive drivers operate so as to support restoring each client PC to a usable state, in part by accepting a broadcast or multicast portion of the disk image (a plurality of sectors) which collectively comprise O/S files necessary to complete the rebooting process. Requests for disk access in the early stage of the boot process will initially be redirected to the network server from each client using the PXE service. The PXE code will facilitate establishment of the initial virtual connection between each client and the server, allowing the server to be seen as another client drive. The PXE code facilitates downloading of additional emulation code, which in turn downloads O/S code that facilitates downloading of the portions of the disk image to be transmitted. During early phases of the boot process, insufficient O/S components have been loaded and activated to provide client O/S supported network access. Consequently, client hard disk access requests are handled through the Int 13h handler and the downloaded emulation code. Roughly 25% through the boot of the O/S, the O/S will assume control over communications with the server using the inventive drivers, effectively bypassing the need for the BIOS Int 13h services.

In yet another embodiment, the system for and method of fast booting an O/S on one or more client PCs from a network server makes use of a hibernation file. In these embodiments, the streamed data includes, among other things, a hibernation file including a hibernation image and several O/S files. Although the streaming process itself does not rely at all on hibernation functionality, the one or more client PC's of these embodiments obviously must each operate an O/S that supports hibernation. Such systems include Microsoft Windows 2000® and XP®. A further description of network booting employing the synchronous streaming method may also be found in the Applicants' co-pending U.S. Pat. No. 6,954,852 issued Oct. 11, 2005 and entitled "System for and Method of Network Booting of an Operating System to a Client Computer Using Hibernation", assigned to the assignee of the present invention, the contents of which are hereby incorporated by reference in their entirety.

The invention advantageously requires less hardware because the client devices may be configured without hard disks. The invention also allows all client PCs to download the same desired data. This translates to easier maintenance of individual client devices since each client is no longer running unique copies of the O/S or the applications. For example, a software upgrade need only be performed on a single disk image or particular group of data sectors, as opposed to any number of individual client PCs. Considering that the streaming data is broadcast or multicast to a plurality of clients, network traffic will be considerably reduced during peak traffic times, such as when a great number of clients are attempting to boot together. The solution provided herein, therefore, is highly scalable, as very few additional system resources will be necessary to boot an increasing number of client PC's.

DETAILED DESCRIPTION

Certain preferred embodiments of the invention will now be described with reference to the accompanying drawings.

As used herein, the terms "MBR" (Master Boot Record), "storage driver", and "network filter driver" refer to bootstrapping software modules developed by the Applicants. In order to differentiate software modules developed by persons other than the Applicants, a convention of preceding such modules' names with "O/S" has been adopted. Also, the terms "virtual drive", "boot drive" and "server drive" are used synonymously in the description that follows.

Figure 1:
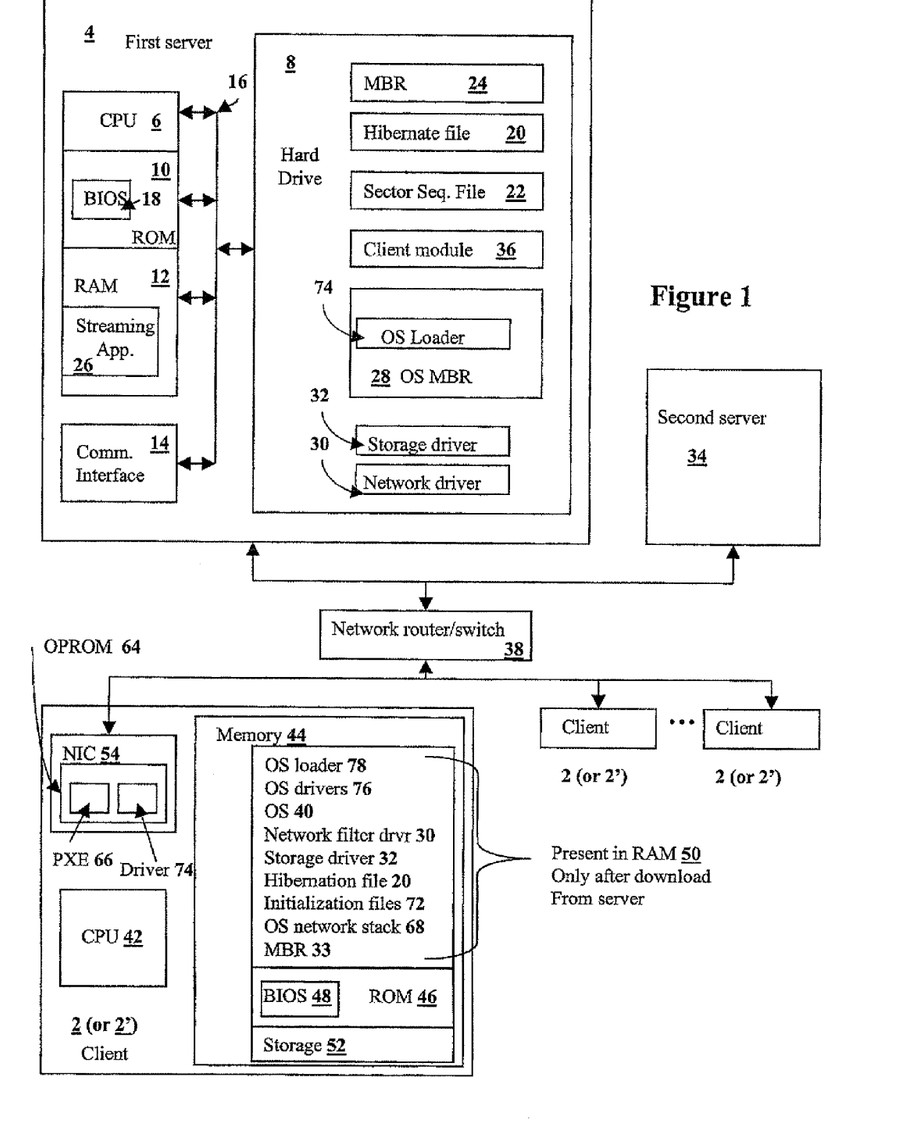
FIG. 1 is a block diagram illustrating a client/server network environment in which the present invention may be practiced.

The networked computing environment shown in FIG. 1 may be an enterprise network or client/server configuration, in which any one of the PC's 2 may function as a file server or network server 4. Network server 4 may be any ordinary type of system, from a relatively small PC to a large mainframe. In the particular embodiments described below, server 4 is a mid-range computer comprised of one or more central processing units (CPUs) 6, a hard drive 8, read only memory (ROM) 10 with its own BIOS 18, random access memory (RAM) 12, and a network adaptor 14 all coupled together by one or more busses 16. Those skilled in the art will recognize that the BIOS 18 is a set of basic routines that helps to transfer information between elements within the network server. In certain embodiments described below, the network server hard drive 8 stores O/S files, such as O/S loaders (e.g., NTLDR) or utility function files (e.g., WIN32.SYS) or even one or more hibernation files 20, a sector sequence file 22, as well as numerous sets of microinstruction code, such as a MBR 24, a streaming module 26, and an O/S MBR 28 including at least a network filter driver 30 and a storage driver 32.

Optionally, one or more additional servers 34 may be coupled to the network and may communicate with the first server 4 and client PCs 2. In a multi-server network, a client module 36 (e.g., HPPC) may also reside on the first server 4 and, in response to requests from client devices 2, specify which additional server 34 contains client addressing information and download information.

The one or more client devices 2 are coupled to the server 4 through a network router or switch 38 in the network. Physical links may assume any of a number of conventional forms, such as cables, switched telephone lines, wireless devices including those operating in radio and infrared spectra, and many others. The client devices and server transfer data to one another using standard network communications protocols. An O/S 40 manages the physical facilities of each client device 2 after a sufficient number of O/S modules and O/S drivers are activated. Each client device is similarly equipped with a CPU 42, such as the x86 family of microprocessors manufactured by Intel Corporation. Each client also includes local memory 44 including ROM 46 storing a BIOS 48, and RAM 50, local storage 52, and a network adapter 54 which are coupled to the CPU by a system bus 56.

FIG. 1 also illustrates a portion of the client's RAM 50 after a sufficient number of sectors have been downloaded and the code they comprise executed. As shown, RAM 50 may contain a downloaded O/S 40, O/S drivers 76, O/S loader 78, O/S utility function file (e.g., WIN32.SYS) 72, network filter driver 30, storage driver 32, and O/S network stack 68. In some embodiments RAM 50 also contains a hibernation file 20.

Figure 2:
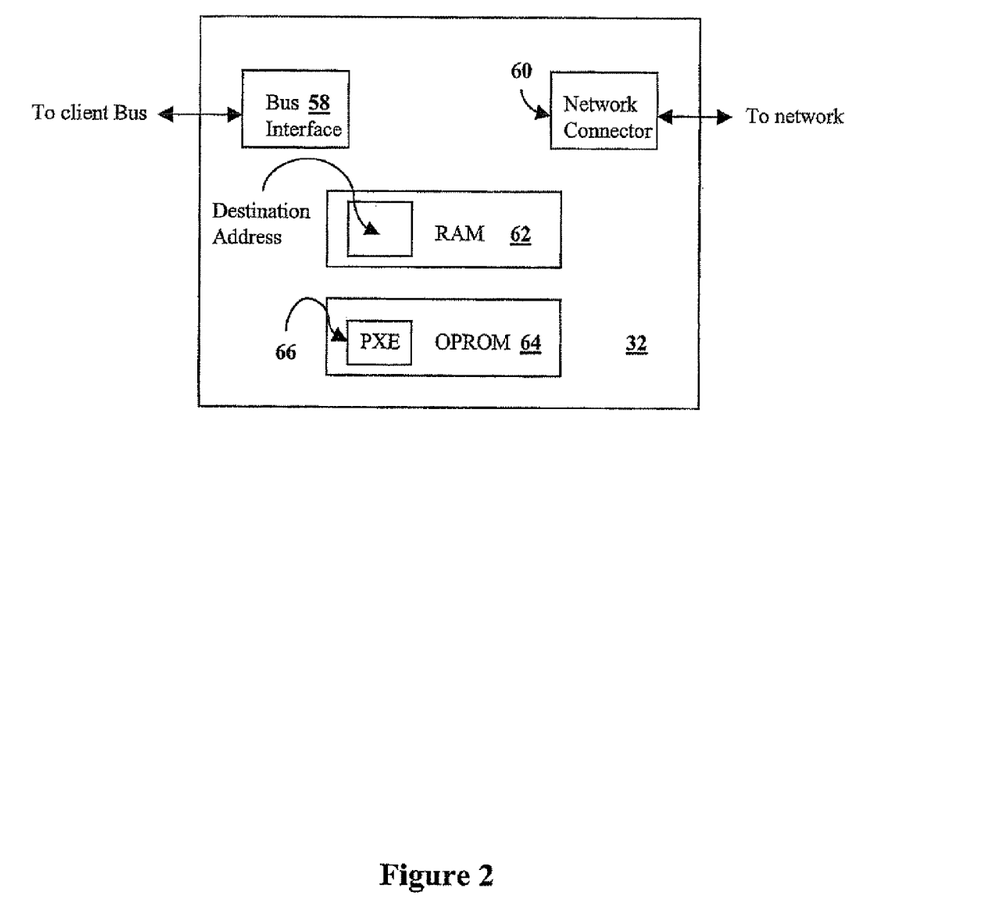
FIG. 2 is a block diagram illustrating a network adapter in accordance one embodiment of the present invention.

Now referring to FIG. 2, the network adapter 54 of each client is preferably a network interface card (NIC) that provides a data link between the hardware of the client and the network. Each NIC 54 includes a bus interface 58 for connecting to the client system bus 56, and one or more network connectors 60 for connecting to the network, which may comprise a LAN or WAN. Also included on the NIC 54 is random access memory (RAM) 62 for storing the unique destination address of the NIC, as well as an Option ROM (OPROM) 64 storing PXE emulation code 66. The destination address enables each client 2 to be individually addressed by any other computer in the network.

Synchronous Streaming of Desired Data to a Plurality of Clients

As stated, the present invention provides a system for and method of streaming data from a network server 4 to one or more clients 2 by transparently emulating a local disk and either broadcasting or multicasting the contents of a set of data sectors residing on the server's "virtual" drive 8 in response to read requests issued by the one or more clients 2. The data may be retrieved in a predetermined manner from a plurality of sectors of a storage device associated with the network server 4. During operation, a set of one or more clients 2 desiring a particular data download issue requests for the download of a plurality of sectors collectively comprising the desired data. Note that different sets of clients may request download of different data. The requests are forwarded to the server, which transparently emulates operation of a local disk at each of the clients. A streaming module 26 resident on the network server 4 broadcasts or multicasts to the set of requesting clients the desired data from the "virtual" storage device. The streaming module 26 preferably accepts the download requests during a predetermined invitation period, prior to transmitting the desired data.

Figure 4:
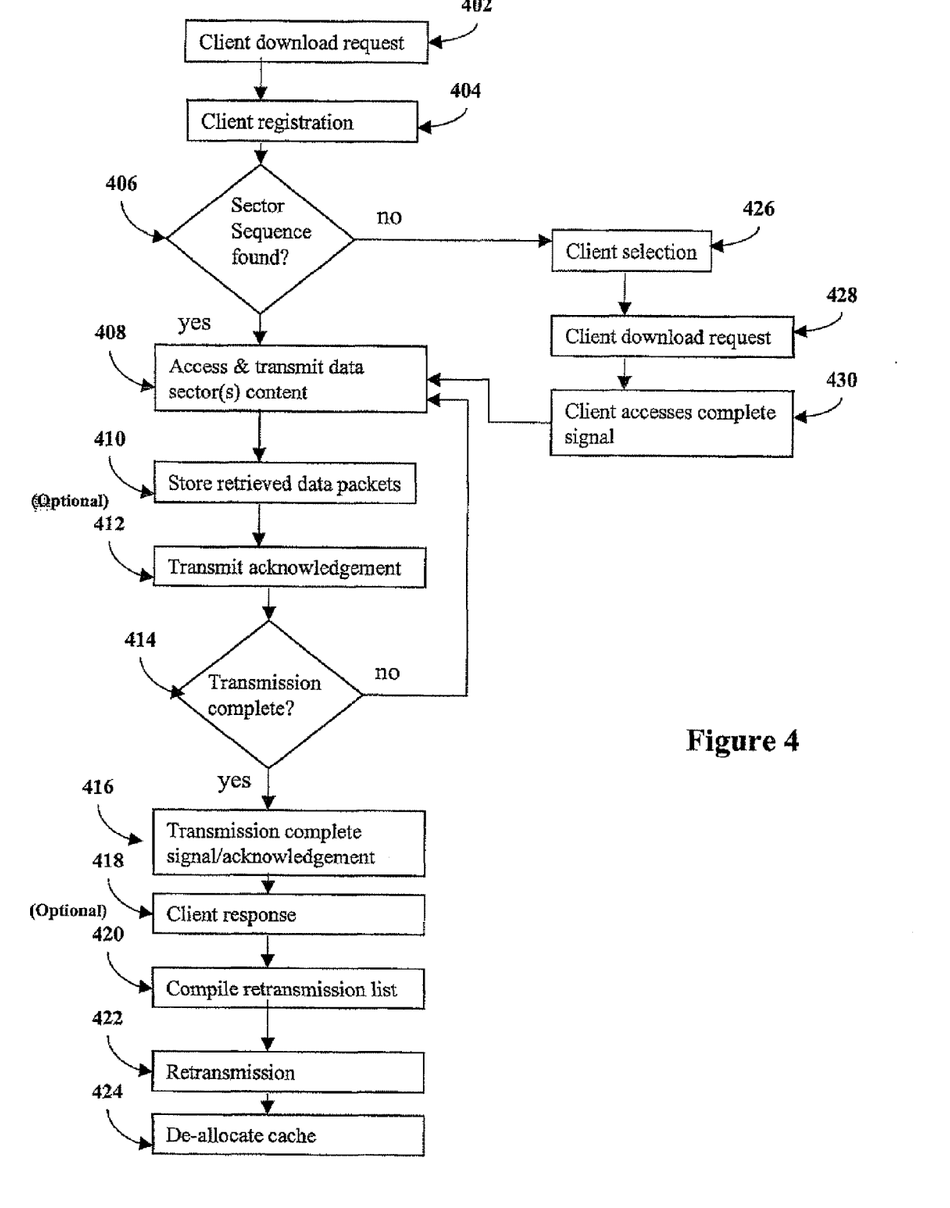
FIG. 4 is a flowchart illustrating an embodiment of a synchronous streaming process provided by the present invention.

FIG. 4 is a flowchart illustrating a process 400 for synchronous data streaming in accordance with the present invention. Note that the following description is written in terms of a single set of clients desiring a download of the same data. This is to facilitate understanding and in no way is intended to be limiting. Artisans can readily appreciate that the synchronous streaming method can be expanded to allow different sets of clients to request simultaneous downloads of different data from the network server.

In step 402, each client desiring to download particular data issues an initial request. Desired data may comprise any application files, O/S files, boot programs, or hibernation files residing on the server virtual drive 8. These requests are issued to the server 4, while the server emulates a client's local disk 52, at various stages of boot up, either through the execution of the PXE code 66 and downloaded MBR 33 code, or through execution of O/S MBR 28 code in conjunction with the network filter and storage drivers.

In step 404, the streaming module 26 of the server registers each client 2' issuing an initial request during a predetermined invitation period. Each registered client now waits and listens for data packets from the streaming module 26.

In step 406, the streaming module looks for a sector sequence file 22 on the server 4. The sector sequence file 22 determines the order in which the streaming module may access and either broadcast or multicast data sectors containing the desired data. If a sector sequence file 22 is not found, program flow passes to a learning process 450 for recording a sector sequence file as described below.

In step 408, if a sector sequence file 22 is found, the streaming module 26 will then proceed to broadcast or multicast in burst mode the desired data to the registered clients 2'. Data packets are preferably transmitted at a fixed rate.

In step 410, data packets received by each registered client 2' are stored into fixed-length queues in order to compensate for differences in the transmission rate and client boot process speed. The network and storage drivers will load the received data into a large, temporary section of memory (a "data cache") that they have pre-allocated on each client. Each registered client keeps track of which data packets it has successfully received. This is facilitated by sequentially numbering the transmitted data packets.

In an optional step 412, each registered client 2' may transmit to the server an acknowledgement that the most recent N number of packets have been attempted to be successfully received. The goal of the client acknowledgments is to ensure that the local client buffers are not overrun.

In step 414, the streaming module 26 determines if all the desired data sectors have been accessed and their contents transmitted. If not, then steps 408 and 410 are repeated until this is accomplished.

In step 416, if all the desired data has been transmitted, the streaming module transmits a message indicating the transmission is complete. However, at this point, not every client may have received all the blocks of information successfully. Some might have dropped packets due to various reasons. Some may have missed the beginning of the transmission.

In step 418, each of the registered clients 2' will respond to the streaming module 26 with a message indicating successful transmission of all the desired data packets, or the need for retransmission of missing packets.

In step 420, the streaming module 26 may then compile and efficiently order a packet retransmission list based upon the response received from the registered clients 2' indicating a need for unsuccessfully transmitted data packets. Alternatively, the packet retransmission list may be compiled repeatedly after each fixed number of bytes during data packet transmission (prior to step 414).

In step 422, the streaming module 26 then may retransmit the needed data packets on an individual basis to the registered clients 2'. As most clients will be busy processing their received data packets at this time, network bandwidth will be high; therefore individual retransmissions should have no discernable effect on boot time or network traffic.

In step 424, after the downloaded data has been successfully processed, the memory previously reserved for the cache is de-allocated.

As mentioned above, an advantage of the streaming process 400 is that, at each client, while that client's O/S may be occupied with initializing O/S data structures, drivers, or applications, future data needs of the O/S will already have been met by preloading the data packets into memory before the O/S has the need for the data. The streaming module 26 broadcasts or multicasts packets to the clients faster than the clients can utilize them, shifting the dependency of boot up time from the data packet transfer time to the client boot process time.

In certain embodiments, the streaming module 26 employs the sector sequence file 22 in determining the order of virtual drive sector contents to be transmitted. It is expected that the sector sequence file 22 will have been stored on the server 4 prior to initiating the synchronous streaming process, but if this has not occurred, the sector sequence file 22 may be generated during the learning process 450 described below.

The learning process 450, is executed if the streaming module 26 cannot find the sector sequence file 22. In one embodiment, the sector sequence file is comprised of a list of sectors that the O/S must read in order to complete the transmission of the disk image transmission. In another embodiment, the sector sequence file is comprised not only the list of sectors but also the sequentially stored actual data contained in the listed sectors. In yet another embodiment, the sector sequence file is comprised a single file including a plurality sector lists and corresponding sector data, such that the simultaneous streaming of different data sets to different sets of requesting clients may be supported. A benefit of storing the actual data is that reading a sequential file is much faster than random reads, and it will in turn increase the server's drive throughput and the ability to more efficiently support multiple streams to multiple clients. One result is that the learned actual data can be read exclusively from the sector sequence file until all of the learned data has been transferred to the client. After that point, the server can revert back to using the virtual drive image. In step 426, the streaming module 26 selects one client from the set of registered clients 2'. In step 428, the selected client is permitted to make its disk access requests conventionally, while the streaming module records in a new sector sequence file all sector access requests the selected client makes to fulfill its desired data download, and, in certain embodiments, the requested data itself. In step 430, the selected client informs the streaming module 26 that it has completed its download. At this point, the new sector sequence file is stored on the virtual drive 8, and the streaming process is resumed at step 408. Described below is a use of the streaming process in network booting applications. If the learning process 450 is required to create a sector sequence file 22 in the context of network booting, the selected client is permitted to boot conventionally, using the inventive MBR 24 and drivers (30 and 32), while the streaming module 26 records in a new sector sequence file all sector access requests the selected client makes while booting, and, in some embodiments, the actual data requested.

BootNIC Basic Architecture

The present invention provides a system for and method of synchronously streaming data, required for client computers to boot quickly, and accessed from data sectors stored on the network server's "virtual" drive. In certain embodiments, the data sectors the client computers wish to download collectively comprise boot programs and O/S files needed to boot. In certain other embodiments, the data sectors may additionally include one or more hibernation files. Each client desiring to download particular data issues an initial request. These requests are issued to the server 4, while the server emulates a client's local disk 52, at various stages of boot up, either through the execution of the PXE code 66 and downloaded MBR 33 code, or through execution of 0/S MBR 28 code in conjunction with the network filter and storage drivers. Stated another way, in the context of a complete network boot of an O/S on a client, the synchronous streaming process 400 is basically duplicated (with some significant differences) before and after the 0/S drivers are initialized. This occurs because the 0/S boot process uses interrupt handler processes to download files from the virtual drive 8 during the early portion of the boot process, but later uses the storage driver 32 and network filter driver 30 after they are initialized. This necessitated the need for two solutions to perform essentially similar tasks.

As each client boots, it will initially communicate with the server 4 using PXE service. PXE code 66 will establish an initial emulated "virtual drive" connection between each client and the server. PXE services allow MBR code 33 to pass read requests to the server, thereby allowing boot files or hibernation files 20 residing on the server to be seen by each client's CPU 42 as a plurality of data sectors which could be stored on a local client hard drive 52. During the early stages of the bootstrapping, emulation is provided by real mode execution of the MBR code 33, since the BIOS interrupt handler services operate only in real mode. Later in the process, emulation is provided by the O/S kernel code and the storage driver 32 and network filter driver 30 which execute only in protected mode (no "thunking" occurs.)

Figure 3:
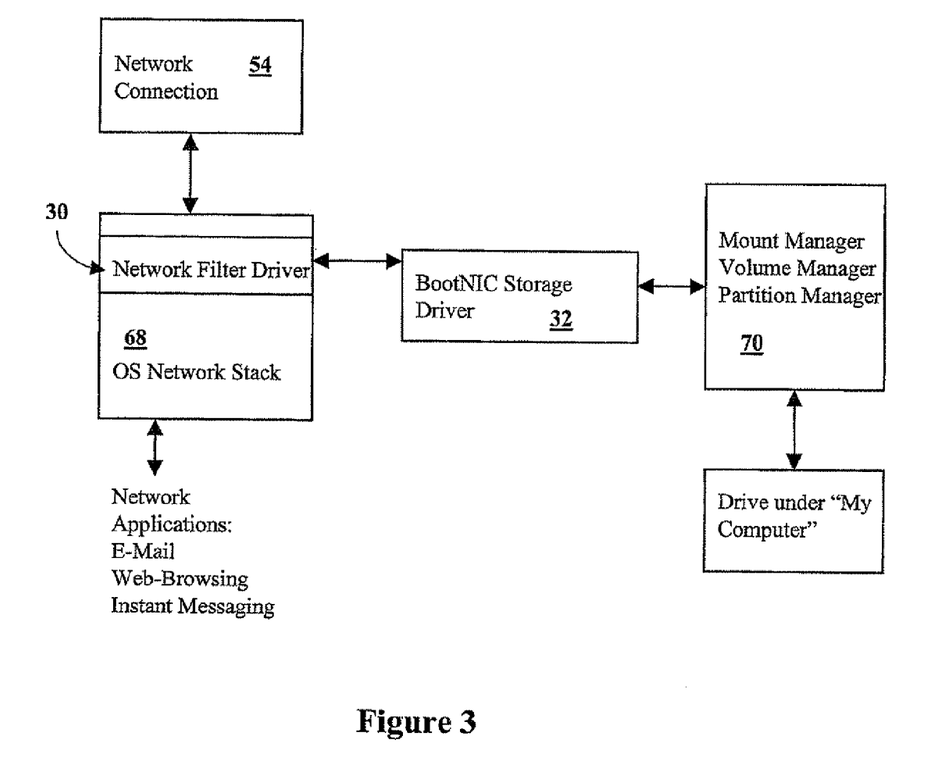
FIG. 3 is a block diagram illustrating an embodiment of a portion of a client's local memory after the inventive drivers have been downloaded from a network server and executed.

FIG. 3 illustrates in block form a portion of a client's local memory 44 after the network filter driver 30 and storage driver 32 have been downloaded from the network server 4 and executed. The sole responsibility of the network filter driver is to view all data packets being passed from the network through the client NIC 54 to the O/S network stack 68 for those packets that are BootNIC specific, and intercepts said specific data packets from being passed further down the network stack 68 and instead passes these packets to the storage driver 32. The storage driver 32 will in turn communicate with Windows' various Managers 70 responsible for storage such as the Mount Manager, Volume Manager, and Partition Manager. If a network data packet is not BootNIC specific, then the data packet is passed down the O/S network stack 68 untouched. Those skilled in the art will appreciate that there are three different types of data packets: (1) broadcast packets, which are packets that are addressed to every computer in the network; (2) multicast packets, which are packets that are addressed to more than one, but not necessarily all, of the computers in the network; and (3) directly addressed packets, which are packets that are addressed to a specific client device only. A system according to the present invention may employ any or all of these data packet transmission approaches.

The present invention takes advantage of the widely-adopted specification known as Pre-Boot EXecution Environment (PXE), which is a result of an effort to create a predictable, interoperable way for clients to interact with a network in a pre-boot environment (with or without an operating system). The current version of PXE was established as a subset of the Intel®-driven industry initiatives of Wired for Management (WfM). PXE embodies three technologies that establish a common and consistent set of pre-boot services with boot firmware of Intel® Architecture-based systems: (i) a uniform protocol for clients 2 to request the allocation of a network IP address, and subsequently request the downloading of a network bootstrap programs (MBR 24 and O/S MBR 28) from a network boot server 4; (ii) a set of APIs available in the pre-boot firmware environment of the client 2 that constitute a consistent set of services that can be employed by the BIOS 48 or bootstrap programs; and a standard method of initiating the pre-boot firmware to execute the PXE protocol on a client PC.

The use of the PXE specification allows, among other things, each client's NIC 54 to serve as a boot device. It also allows the BIOS 48 to make direct use of the NIC code stored on the OPROM 64 before and during the POST process. The present invention, in certain embodiments, optionally takes advantage of the PXE feature of boot server discovery. Using this feature, the booting client 2 can discover an appropriate boot server 4 or 34 from a list of available boot servers provided to the client 2 during the initial phase of the remote boot. Boot server types can be assigned and maintained by an information technology administrator based on the client's system architecture type or even each client's unique ID. PXE uses Dynamic Host Configuration Protocol and Trivial File Transfer Protocol to communicate with the server 4. When a PXE enabled client boots, it obtains an IP address from a DHCP server 4. The client 2 may then discover the DHCP server 4, which provides the client with a list of boot servers. In FIG. 1, an additional server 34 is shown, which could act in the capacity of a boot server. In order to facilitate the explanation of the invention, the simultaneous streaming processes are described in the context of a single server 4 network embodiment, and embodiments in which a single set of clients is requesting download of the same data.

Alternatively, BOOTP enabled clients with a static IP address can also be used instead of the DHCP and PXE method, but with the loss of flexibility and ease of configuration.

Streaming Boot from a Network Hibernation Image

As used herein, the term "hibernate" generally indicates that a PC's power is turned off in such a way that the PC is "paused." While the PC is off, power is removed from all or most of its components. And when the PC is turned back on or "resumed", it is returned to normal operation in the same state in which it was turned off. A "hibernate function", such as is described in U.S. Pat. No. 6,209,088 assigned to Microsoft Corp® is to be invoked just prior to turning off the PC, interrupting all program execution and saving all PC state information to a "hibernate image" in non-volatile storage. A "resume function" executes from volatile memory, implemented by code that is typically executed from the same executable address space that is used by the O/S and/or application programs initiated by the O/S. In particular embodiments of the invention described below, a "hibernate file" may also comprise O/S files such as O/S drivers and initialization files which are read into the PC's volatile memory prior to initiating the hibernate function.

The present invention, in another aspect, provides an improved system for and method of booting an O/S to one or more clients 2 from a server 4 storing a hibernation image 20 having O/S files for the client PC's. Each client's CPU 42 executes instructions only from addressable memory such as DRAM or some other type of volatile, electronic memory. In order to initialize this addressable memory, a small amount of PXE code 66 is provided in an OPROM 64 on the NIC 54. The PXE code 66 allows a request to be issued, to the network server 4 emulating a client local disk, to read the MBR code 24. The downloaded MBR code 33 enables further disk emulation, and requests an initial portion of the O/S MBR 28, to be transmitted from the server to the client, where it is loaded into DRAM. The O/S MBR 28 is then responsible for downloading and initializing remaining portions of the O/S, which in turn download the hibernation file 20. Here again, it should be noted that in some systems within the scope of the present invention, different sets of clients may request downloads of different boot files of hibernation files. The Applicants have observed that synchronous streaming reduces by over 50% the time required to boot an O/S 40 over a network, as opposed to a standard O/S local boot.

The hibernation transaction protocol consists of two halves. The first half comprises generating the hibernation image on the boot drive 8 and the second half is the actual resume from the hibernation image.

Prior to starting the inventive boot up process, the hibernation file 20 residing on the server 4 is generated in a straightforward manner. Once a client PC is configured to a desired state, the hibernate function is employed to create a hibernation image in the hibernation file 20. The hibernation file 20 is then transferred to the server's boot drive 8. Alternatively, the hibernation process could be executed such that the hibernation file is saved directly to the server boot drive 8. Although the hibernate function instructs all drivers to power down, the storage driver 32 only does so at the request of the O/S, after caching WIN32.SYS 72 into local memory 50 and writing the memory contents to the file HIBERFIL.SYS (the file O/S loader checks for validity upon resuming). Another step preferably performed prior to initiating the boot process is storing on the boot drive 8 the MBR 24 emulation code.

The architecture of Windows® requires two drivers, the storage driver 32 and network filter driver 30, in order to communicate with the server rather than only one, because drivers are required to take on a "type" and one driver cannot simultaneously be a storage driver and a network driver. Windows 2000 and XP's implementations of hibernation assume only one O/S driver will be required to communicate with the storage device, and, accordingly, provide no mechanism to allow the hibernation process to support more than one O/S driver. Presently available standard O/S drivers will not work because they have not been written to resume from a file over a network. In the standard resume from a local drive, an O/S storage driver is only required to (and only does) know how to communicate with the local hard drive.

The storage driver 32 "hooks" into the dispatch routines of the NIC driver 74 by replacing the dispatch address for a power handler in the NIC driver 74 with the storage driver's own handler. The storage driver 32 may then call the original NIC driver power handler routine.

The booting process is comprised of many steps, but generally speaking involves one program starting another, each more intelligent than the one before. The major steps of the present inventive method are the BIOS initialization, PXE initialization, the MBR loading and Int 13h redirection, the loading of the hibernate image, and the O/S resume. Note that this solution is specific to Windows 2000; however, the steps listed below encapsulate a generic framework for extending the solution to other operating systems.

Figure 5:
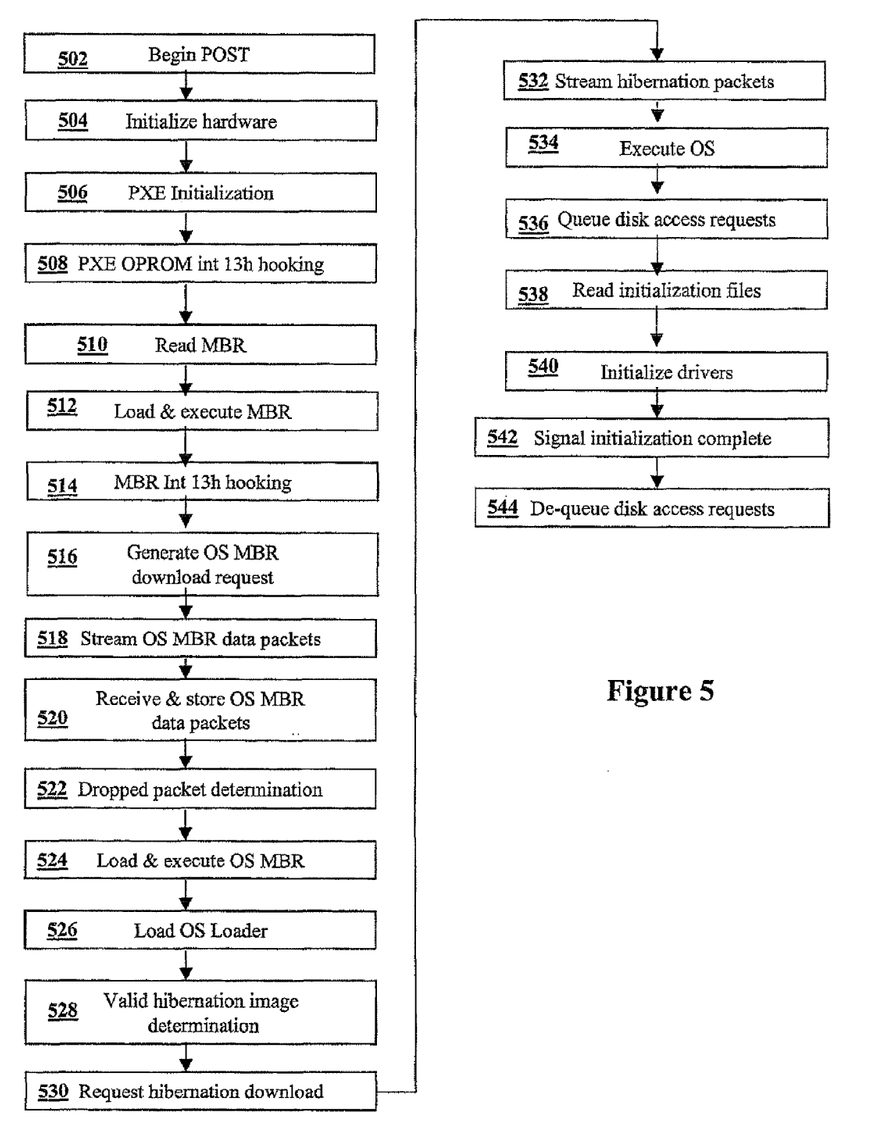
FIG. 5 is a flowchart illustrating an embodiment of a network booting process employing a hibernation image file.

With reference to FIG. 5, upon powering up, the BIOS 48 initialization of client 2 immediately begins with the execution of a power-on/self-test (POST) sequence (Step 502). Each client broadcasts a DHCP discovery request to ascertain its own IP address. The server's O/S, which supports this protocol (and others), returns these parameters as well as the address of a server to boot from, which may or may not be the network server 4. The virtual boot drive 8 may comprise any nonvolatile storage device associated with the network server 4 (or alternative boot server 34). Types of drives could include floppy disks, hard disks, magnetic tape, DVD's, CD-ROMs, and flash ROMs. To be a virtual boot drive 8, a device should hold a copy of a hibernation file containing O/S files, or microinstruction code that is intended to be downloaded.

During the POST, the CPU 42 checks addresses on the bus 56 to determine if an OPROM 64 is present on the client 2. If it finds an OPROM, the CPU processes any hardware initialization routines located on the OPROM, which initializes the NIC 54 (Step 504) to a usable state. The OPROM code then initializes the PXE code 66 (Step 506). The OPROM code also "hooks" into the BIOS boot process through the interrupt 13h handler services (Step 508) which controls reads and writes to the hard drive 52. By using the PXE code and assuming control over the NIC 54, the OPROM 64 code communicates with the server 4 and allows the server's hard drive 8 to transparently emulate a local disk drive 52 of the client 2 through redirection of disk reads and writes to the server.

At the end of the POST sequence, the BIOS 48 will start the booting of the O/S. The BIOS reads the first sector (cylinder 0, head 0, sector 1) of the server's virtual drive 8 (Step 510). The first sector stores the MBR 24 (Master Boot Record) that contains additional emulation code to boot the O/S 40. The MBR 24 code is traditionally provided by the O/S manufacturer, but in order to facilitate the hibernation resume process described below, it was necessary to develop additional emulation code. The MBR code is executed after being loaded into client memory (Step 512). The MBR code continues to use PXE 66 to communicate with the network server, and hooks interrupt 13h in order to capture all storage access requests, preventing writes to the server's virtual hard disk 8 (Step 514) during the early portion of the boot process. Read requests are preferably processed using the synchronous streaming method 400 described above. Read requests are not passed to the original Int 13h BIOS routine, but instead PXE is used by the MBR to receive data from the network server 4. Read requests are satisfied by the MBR code, and requests are then returned to the requester with the data downloaded from the network server. Disk writes are handled differently. The MBR code does not perform writes, but returns a successful write indication to the disk write requestor. Writes are also not passed to the original Int 13h BIOS routine.

The MBR code then proceeds to download an O/S MBR 28 developed by the O/S manufacturer, shown in FIG. 1 as "Windows 2000 MBR". The MBR code 88 at each client 2, through its hooking of the Int 13h vector, captures all requests for local disk reads before the OPROM 64 has an opportunity to see the requests. The downloaded MBR 88 then forwards, using PXE 66, the requests to the network server (step 516) to download the O/S MBR 28.

In step 518, the network server 4 may synchronously stream data packets that collectively comprise the O/S MBR 28 from the server's virtual drive 8 to each client 2 requesting the O/S MBR download. Streaming module 26 registers for download all clients 2 which make an O/S MBR download request during an invitation period. The invitation period may consist of a predetermined time period that gives all clients an opportunity to register. The streaming module 26 then designates a first client as a Read Requestor. That is, only that client will be allowed to make a read request of the streaming module 26 to transmit to all the registered clients 2' the contents of the next data sector. The streaming module 26 then accesses and simultaneously transmits to each of the registered clients 2' the identity of the Read Requestor and the contents of a first sector of a group of sectors on the virtual drive 8 which collectively store the O/S MBR 28. The streaming module will then determine if all sectors of the O/S MBR group of sectors have been transmitted. If more sectors are required to be transmitted, the streaming module will designate a new Read Requestor client, provided, of course, that there is more than one registered client. Next, the streaming module accesses the next sector and simultaneously transmits its contents with the identity of the new Read Requestor to each of the registered clients 2'. The step of designating a new Read Requestor is preferably performed in a round-robin fashion, whereby one registered client following each sector transmission round will in turn have responsibility for generating a virtual drive read request while the non-designated clients simply wait for transmitted data. This streaming process 400 is repeated until the entire O/S MBR 28 has been transmitted and subsequently loaded at each client, at which time the downloaded O/S MBR takes control of the network interface 54 and request generation process.

Note that each read request, regardless of which registered client it has come from, will be identical. The read requesting effected by the MBR code may, therefore, proceed in a lock-step fashion. Each read request will be identical because each client will be requesting a read from the same virtual drive and executing the same MBR 28 already downloaded from that virtual drive.

Referring again to FIG. 5, in step 520 each registered client 2' has received and stored the transmitted O/S MBR sectors. The received data sectors are stored in RAM 50. Each sector is sent with a sequential number. Each client may then determine (step 522) whether the client successfully received all the sectors that were transmitted. If a client is missing a data packet, the client will then asynchronously request from the network server the missing data sector. This data, though, will only be returned to that individual client and not broadcast or multicast to all the registered clients.

In step 524, the O/S MBR 28 (e.g., Windows 2000 MBR) is loaded into each client's memory 50 and executed. The O/S MBR in turns downloads from the virtual drive an O/S loader 74 (e.g., file NTLDR) (step 526) written by the O/S manufacturer. The downloaded O/S loader 78 will check if a valid hibernation image 20 exists on the virtual drive 8 (step 528). The virtual drive has previously been set up to contain the valid hibernate image 20. The O/S loader 78 then begins to load the hibernate image through a series of Int 13h read requests that the MBR 33 will capture and redirect to the network server 4 (step 530). The streaming process 400 may again be deployed, on this occasion to access and transmit the contents of a plurality of sectors on the virtual drive 8 that collectively store the hibernation file 20 (step 532).

Once the hibernate image has been copied to each client's local memory 44, the O/S loader 78 passes execution to the O/S 40 restored from the hibernation image, i.e., Windows XP or 2000 (step 534). Note that, from this point forward, that read requests are not performed in a synchronous manner. Rather, they are transmitted to and answered by the network server on an individual basis.

The O/S 40 now needs to begin waking drivers 76, such as storage driver 32, and to perform some initialization to bring the system back to a usable state. One difficulty encountered here is that the storage driver 32 must prevent any reads or writes until the NIC driver 74 and network filter driver 30 have been initialized. However, the network filter driver will not be initialized until the O/S 40 has read the file providing system utility functions (e.g., WIN32.SYS). This problem has been solved by the early caching of WIN32.SYS into client memory 50 before creating the hibernation image, thereby making the file a part of the hibernation image itself that has now been read into local memory 50. Thus, the file WIN32K.SYS can be read from local memory without accessing the virtual drive 8. With one exception, the storage driver 32 queues all O/S disk write and read requests into a cache also previously allocated during the creation of the hibernation image, and now in the client system's memory 50. The storage driver 32 simply stores the requests until it's safe to allow the requests to be processed, i.e., after the NIC driver 74 and network filter driver 30 have been initialized (step 536). The file WIN32K.SYS is read from local client memory and the data is returned back to the O/S (step 538).

The O/S 40 then awakens the NIC driver 74 and network filter driver 30 (step 540). In step 542, the network filter driver 30 informs the storage driver 32 that the NIC 54 has been initialized and that the network filter driver 30 is ready to accept the pending read and write requests. Alternatively, the storage driver 32 may have previously (during the creation of the hibernation image) "hooked" into the NIC driver 74 dispatch function, monitoring its data for "IRP_MJ_POWER". This alerts the storage driver 32 when the network drivers have been awakened. Once the O/S 40 transmits IRP_MJ_POWER to the NIC driver 74, the request will always be for full power-on. The storage driver 32 will wait for the NIC driver to finish processing the IRP_MJ_POWER, which then means the network drivers have been fully awakened.

In step 544, the storage driver then de-queues all the cached read and write requests to restore the O/S 40 to a usable state, after which a user may use the client PC in the normal manner. Note that in this embodiment the storage driver handles reads and writes slightly differently. That is, the storage driver caches locally all writes so that the writes are never committed to the virtual driver, in order that different clients do not simultaneously write to the same virtual image and corrupt it. Conversely, reads are actually read from the virtual drive unless a copy of the needed sector has already been cached on the client. In the latter case, the sector is read from the cache in the client's memory and no network transaction takes place.

Other embodiments of the invention will be apparent to those skilled in the art from a consideration of the specification or practice of the invention disclosed herein. For example, in some embodiments, the synchronous streaming process 400 may be used only in downloading data requested by the interrupt handler processes, or only in the protected-mode accesses of the server. Or the synchronous streaming process 400 may be employed in preloading applications into the clients. Similarly, in other embodiments, booting from a network copy of a hibernation image without the use of the MBR code to synchronize the request and receipt of data packets is within the scope of this invention. It is, therefore, intended that the specification and examples be considered as exemplary only, with the true scope and spirit of the invention being indicated by the following claims.

What is claimed is:

1. A method for using a hibernation image from a network to boot a client computing device, the method comprising:
   (a) transmitting, by a client computing device to a server, a first disk read request generated by a pre-boot execution environment protocol of the client computing device;
   (b) receiving in response to the first disk read request, by the client computing device from the server, data comprising a first master boot record;
   (c) executing, by the client computing device, the received first master boot record;
   (d) transmitting, by the client computing device to the server, a second disk read request generated by the first master boot record;
   (e) receiving in response to the second disk read request, by the client computing device from the server, data comprising a second master boot record;
   (f) executing, by the client computing device, the received second master boot record;
   (g) downloading, by the second master boot record, an operating system loader;
   (h) determining, by the operating system loader, existence of a valid hibernation image on the server;
   (i) issuing, by the operating system loader, a third disk read request, the third disk read request directed to a disk sector comprising the hibernation image;
   (j) intercepting, by the first master boot record, the third disk read request and redirecting the intercepted request to the server;
   (k) receiving, by the client computing device from the server, the hibernation image; and
   (l) booting, by the client computing device, an operating system using the hibernation image received from the server.

2. The method of claim 1, further comprising storing, by the client computing device, the hibernation image locally on the client computing device.

3. The method of claim 1, further comprising identifying, by the client computing device, a sector comprising a portion of the hibernation image not received by the client computing device from the server and requesting from the server retransmission of the sector.

4. The method of claim 1, further comprising caching, by the client computing device, a file providing system utility functions with the hibernation image.

5. The method of claim 1, further comprising de-queuing, by a storage driver executing on the client computing device, read and write requests from the client computing device.

6. A system for using a hibernation image from a network to boot a client computing device comprising:
   a client computing device
      transmitting to a server a first disk read request generated by a pre-boot execution environment protocol of the client computing device;
      executing a first master boot record received in response to the first disk read request;
      transmitting to the server a second disk read request generated by the execution of the first master boot record;
      executing a second master boot record received in response to the second disk read request;
      downloading, by the second master boot record executing on the client computing device, an operating system loader;
      determining, using the operating system loader, existence of a valid hibernation image on the server, issuing, by the operating system loader, a third disk read request, the third disk read request directed to a sector comprising the hibernation image;
      intercepting, by the first master boot record, the third disk read request and redirecting the intercepted request to the server; and
      booting an operating system using the hibernation image received from the server; and
   the server
      transmitting to the client computing device data comprising the first master boot record;
      transmitting to the client computing device data comprising the second master boot record; and
      transmitting to the client computing device the hibernation image.

7. The system of claim 6, wherein the client computing device stores the hibernation image locally on the client computing device.

8. The system of claim 6, wherein the client computing device identifies a sector comprising the hibernation file not received by the client computing device from the server and requesting from the server retransmission of the sector.

9. The system of claim 6, wherein the server transmits to a plurality of client computing devices, data comprising the first master boot record.

10. The system of claim 6, wherein the server transmits the hibernation image to a plurality of client computing devices.

11. The system of claim 6, wherein a managing server identifies the server from a plurality of servers to be paired with the client computing device.

12. The system of claim 6, wherein the client computing device caches a file providing system utility functions with the hibernation image.

13. The system of claim 6, wherein a storage driver executing on the client computing device de-queues read and write requests from the client computing device.

* * * * *

UNITED STATES PATENT AND TRADEMARK OFFICE
CERTIFICATE OF CORRECTION

| | | |
|---|---|---|
| PATENT NO. | : 8,352,624 B2 | Page 1 of 1 |
| APPLICATION NO. | : 11/957929 | |
| DATED | : January 8, 2013 | |
| INVENTOR(S) | : Myron Zimmerman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 845 days.

Signed and Sealed this
Eleventh Day of November, 2014

Michelle K. Lee
*Deputy Director of the United States Patent and Trademark Office*